(12) United States Patent
Roffe et al.

(10) Patent No.: US 12,045,317 B2
(45) Date of Patent: Jul. 23, 2024

(54) FEATURE SELECTION USING HYPERGRAPHS

(71) Applicant: International Business Machines Corporation, Armonk, NY (US)

(72) Inventors: Eliran Roffe, Haifa (IL); Sandeep Hans, New Delhi (IN); Eitan Daniel Farchi, Haifa (IL); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 17/533,898

(22) Filed: Nov. 23, 2021

(65) Prior Publication Data

US 2023/0161846 A1 May 25, 2023

(51) Int. Cl.
*G06V 10/00* (2022.01)
*G06F 18/2323* (2023.01)
*G06F 18/2411* (2023.01)
*G06N 20/20* (2019.01)

(52) U.S. Cl.
CPC ...... *G06F 18/2411* (2023.01); *G06F 18/2323* (2023.01); *G06N 20/20* (2019.01)

(58) Field of Classification Search
CPC ............ G06N 3/08; G06N 3/02; G06N 3/092; G06N 3/045; G06N 3/0475; G06N 3/042; G06N 20/00; G06N 20/20; G06N 5/01; G06N 5/022; G06N 7/01; G06F 18/2411; G06F 18/2323
See application file for complete search history.

(56) References Cited

U.S. PATENT DOCUMENTS

| | | | | |
|---|---|---|---|---|
| 5,748,850 | A * | 5/1998 | Sakurai | G10L 15/083 706/50 |
| 8,365,142 | B2 * | 1/2013 | Kajiya | G06F 8/10 717/106 |
| 9,613,086 | B1 * | 4/2017 | Sherman | G06F 16/248 |
| 9,779,150 | B1 * | 10/2017 | Sherman | G06F 16/26 |
| 10,019,538 | B2 * | 7/2018 | Kartha | G06N 5/027 |
| 10,115,059 | B2 * | 10/2018 | Moore | G06N 5/048 |
| 10,410,385 | B2 * | 9/2019 | Banerjee | G06T 11/206 |
| 11,469,969 | B2 * | 10/2022 | Mopur | H04L 41/22 |

(Continued)

FOREIGN PATENT DOCUMENTS

| | | |
|---|---|---|
| CN | 109325511 A | 2/2019 |
| WO | 2018228667 A1 | 12/2018 |

OTHER PUBLICATIONS

Sasaki, JPWO2019171527A1 Reachability determination device, reachability determination method and program; Publication Date: Feb. 4, 2021.*

(Continued)

*Primary Examiner* — Amir Alavi
(74) *Attorney, Agent, or Firm* — Scott S. Dobson

(57) ABSTRACT

An example system includes a processor to receive a set of features, a set of relations between the features, and a set of target features. Each of the target features is associated with a number of the relations. The processor can generate a hypergraph based on the features and the relations. The processor also can select a subset of features based on a transitive closure of the hypergraph for each of the target features. The processor can transmit the selected subset of features.

19 Claims, 7 Drawing Sheets

(56) References Cited

U.S. PATENT DOCUMENTS

| | | | |
|---|---|---|---|
| 11,710,139 B1* | 7/2023 | Wan | G06Q 30/0631 |
| | | | 705/14.54 |
| 2003/0033126 A1* | 2/2003 | Lincoln | G16B 5/10 |
| | | | 703/11 |
| 2019/0325343 A1* | 10/2019 | Feng | G06F 17/16 |
| 2023/0161846 A1* | 5/2023 | Roffe | G06N 7/01 |
| | | | 382/159 |

OTHER PUBLICATIONS

Chen et al., "New Feature Selection Methods Based on Context Similarity for Text Categorization", 2014 11th International Conference on Fuzzy Systems and Knowledge Discovery (FSKD), Published Aug. 21, 2014, pp. 598-604.

Henni et al., "Unsupervised Graph-based Feature Selection via Subspace and PageRank centrality", Expert Systems with Applications, Published Dec. 2018, 15 pages.

Mell et al., "The NIST Definition of Cloud Computing", National Institute of Standards and Technology, U.S. Department of Commerce, Special Publication 800-145, 7 pages.

Singh et al., "Optimal Feature Selection using Fuzzy Combination of Feature Subset for Transcription Data", 2018 EEE International Conference on Fuzzy Systems (FUZZ-IEEE), Published Jul. 13, 2018, 8 pages.

Zhang et al., "A Hypergraph-based Approach to Feature Selection", International Conference on Computer Analysis of Images and Patterns, 2011, 8 pages.

* cited by examiner

FEATURE SELECTION USING HYPERGRAPHS

BACKGROUND

The present techniques relate to feature selection. More specifically, the techniques relate to selection of features for training machine learning models.

SUMMARY

According to an embodiment described herein, a system can include processor to receive a set of features, a set of relations between the features, and a set of target features, wherein each of the target features is associated with a plurality of the relations. The processor can also further generate a hypergraph based on the features and the relations. The processor can also select a subset of features based on a transitive closure of the hypergraph for each of the target features. The processor can further transmit the selected subset of features.

According to another embodiment described herein, a method can include receiving, via a processor, a set of features, a set of relations between the features, and a set of target features, wherein each of the target features is associated with a plurality of the relations. The method can further include generating, via the processor, a hypergraph based on the features and the relations. The method can also further include selecting, via the processor, a subset of features based on a transitive closure of the hypergraph for each of the target features. The method can also include transmitting, via the processor, the selected subset of features.

According to another embodiment described herein, a computer program product for selection of features can include computer-readable storage medium having program code embodied therewith. The computer readable storage medium is not a transitory signal per se. The program code executable by a processor to cause the processor to receive a set of features, a set of relations between the features, and a set of target features, wherein each of the target features is associated with a plurality of the relations. The program code can also cause the processor to generate a hypergraph based on the features and the relations. The program code can also cause the processor to select features based on a transitive closure of the hypergraph for each of the target features. The program code can also cause the processor to transmit selected features.

DETAILED DESCRIPTION

Feature selection approaches may be used to reduce redundant or dependent features in ML tasks, enable faster training of ML networks, and reduce overfitting and complexity. However, these approaches may not understand some learning objectives. For example, the learning objectives may be target features or combinations of target features to be learned by an ML network. When there are several learning objectives the feature selection may be much harder. Moreover, these techniques rely on relations between features, and may not consider relations based on the feature values themselves.

Currently, there are various approaches for feature selection. Many of these approaches are based on correlations or exploring dependencies between features. For example, these approaches include Linear Discriminant Analysis (LDA), Principal Component Analysis (PCA), Least Absolute Shrinkage and Selection Operator (LASSO) and Analysis of Variance (ANOVA). These approaches may attempt to solve the same feature selection problem. However, these approaches may not consider the values of the features, nor the learning objectives.

According to embodiments of the present disclosure, a system includes a processor to receive a set of features, a set of relations between the features, and a set of learning objectives. The processor can generate a hypergraph based on the features and the relations. The processor can select a subset of features based on a transitive closure of the hypergraph for each learning objective. The processor can transmit the selected subset of features. Thus, embodiments of the present disclosure enable the ability to automatically select features by considering all learning objectives, and to consider more than one relation per target feature. In addition, the embodiments of the present disclosure enable relations based on feature values to be considered. Moreover, machine learning models trained using the subset of selected features generated by the embodiments described herein may perform with improved accuracy. In particular, the feature selection approaches improves the training of the model and thus reduces overfitting and complexity of the resulting machine learning model.

Figure 1:
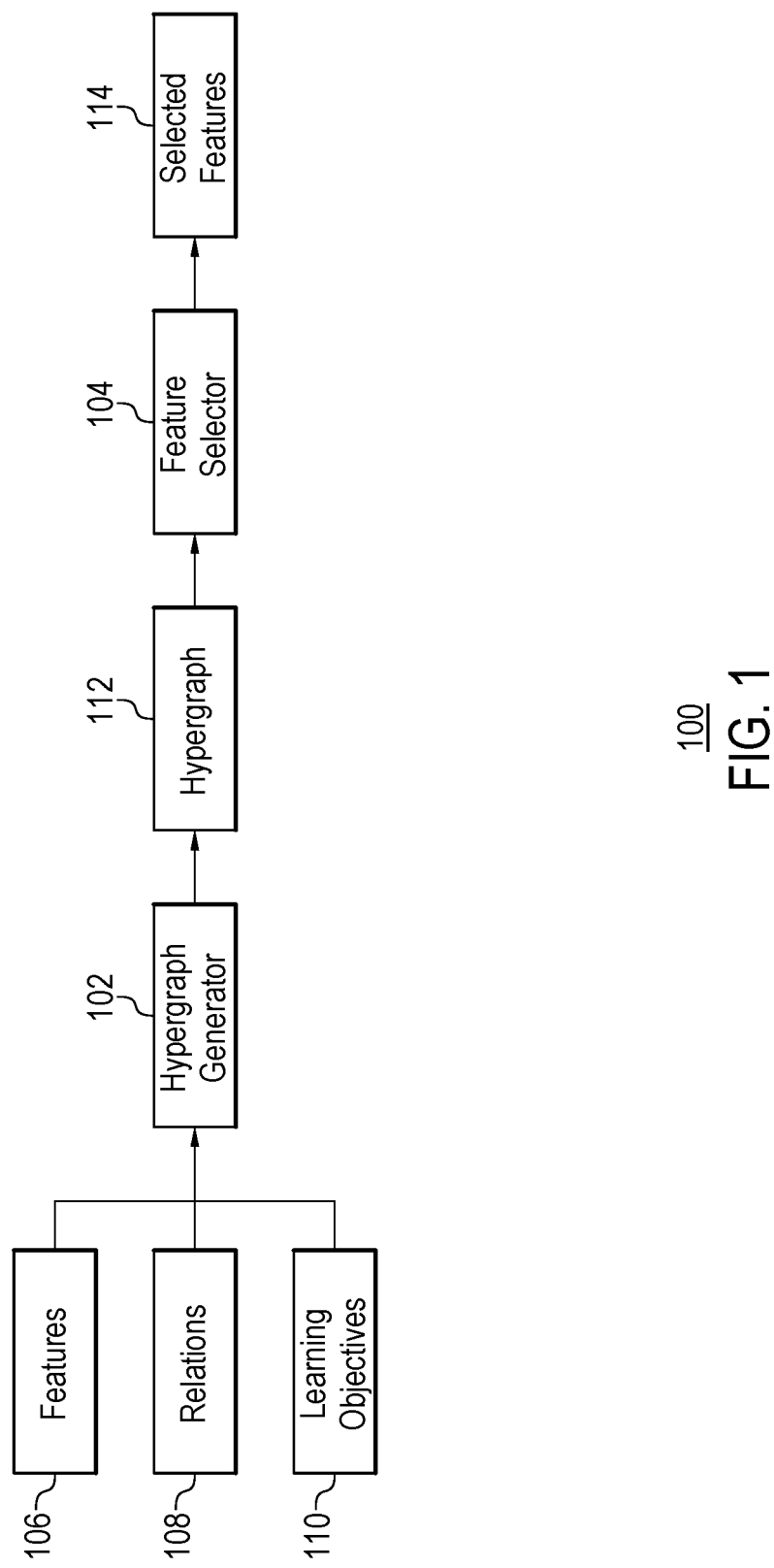
FIG. 1 is a block diagram of an example system for selection of features using hypergraphs.

With reference now to FIG. 1, a block diagram shows an example system for selection of features using hypergraphs. In various examples, the system 100 may be used to execute method 300 of FIG. 3. The example system 100 includes a hypergraph generator 102. The system 100 include a feature selector 104 communicatively coupled to the hypergraph generator 102. The system 100 includes a set of features 106, relations 108, and learning objectives 110 shown being received by the hypergraph generator 102. For example, the learning objectives 110 may include target features or target combinations of features to be used for the selection of features. The hypergraph generator 102 is shown generating a hypergraph 112. The feature selector 104 is shown generating a set of selected features 114.

In the example of FIG. 1, the system 100 may execute a feature selection for a machine learning (ML) task given a set of target features to be used as learning objectives. For example, the feature selection may generally include identifying relations between the data set features, generating a hypergraph based on the relations, and finding all features which influence each target feature or combination of target features. In various examples, the feature selection may be based on applying a graph, machine learning, and statistics techniques. For example, the graph may be a hypergraph with nodes representing features and hyperedges representing relations between the features. As one example, the generated graph may be similar to the example hypergraph 200 of FIG. 2. In various examples, the machine learning techniques may include calculating a transitive closure, and the statistics may include calculating a linear regression. In particular, given relations 108 between the data set features 106, the hypergraph generator 102 may generate a hypergraph 112 based on the given relations 108. The feature selector 104 may then find and select all of the features 106 that influence each learning objective 110 by calculating a transitive closure over the generated hypergraph 112. The result may be set of selected features 114.

In various examples, for each target feature z of the features 106 in a data set, the hypergraph generator 102 can consider a given relation 108 based on z and features $X_1 \ldots X_n$. For example, the value n may be predefined. In various examples, the hypergraph generator 102 can also consider various converted values of the target features. In some examples, if the relation strength was below a predefined threshold, then a conversion of the target feature z may have been executed. In various examples, the relation strength and predefined threshold may be any suitable statistical metric. For example, the relation strength and predefined threshold may in the form of statistical metrics such as R-Squared values or root-mean-square error (RMSE) values. In some examples, in response to detecting that the target feature z is numerical, then the target feature z may be converted to a set of a bounded number of values. For example, the bounded number of values may be based on target feature z value ranges or prevalent values. In some examples, a threshold for the number of appearances of a specific value may be set. Prevalent values exceeding the threshold may be kept, and all less frequently used values may be converted to some domain. In some examples, in response to detecting that the target feature z is categorical, then the target feature z may be converted to a set of its values. For example, the bounded number of values may be based on the existing values of target feature z. When there are many categories, the prevalent values may be kept by setting a threshold, and a specific common value defined to the non-frequent values.

In various examples, the hypergraph generator 102 can create a directed hypergraph G=(V, E) 110, where V is the set of features represented as vertices and E is a set of weighted hyperedges. For example, each hyperedge may represent a partially ordered subset of features. In some examples, for each identified relation, the hypergraph generator 102 can add a hyperedge from vertices of features $X_1 \ldots X_n$ to the target feature z (tail). In various examples, the weight of each hyperedge symbolizes the strength of the relation. For example, the strength of the relation may be measured as an R-Squared value or an RMSE value.

The feature selector 104 may define the empty set S as the set of all selected features. For each learning objective I representing a target feature or a combination of target features, the feature selector 104 can calculate the transitive closure of the hypergraph 110 for learning objective I and weighted hyperedge E. For example, all additional edges to learning objective I are not considered. The feature selector 104 can then add all vertices of features $X_1 \ldots X_n$ in the transitive closure to S. The resulting set S contains all selected features.

In various examples, the selected features 114 may be transmitted for training a machine learning model. For example, a machine learning trainer (not shown) may then use the set S to train a machine learning model. Thus, the machine learning model may be trained more efficiently and effectively using a training set based on the selected features.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional features, relations, learning objectives, or additional graphs, selected features, etc.).

Figure 2:
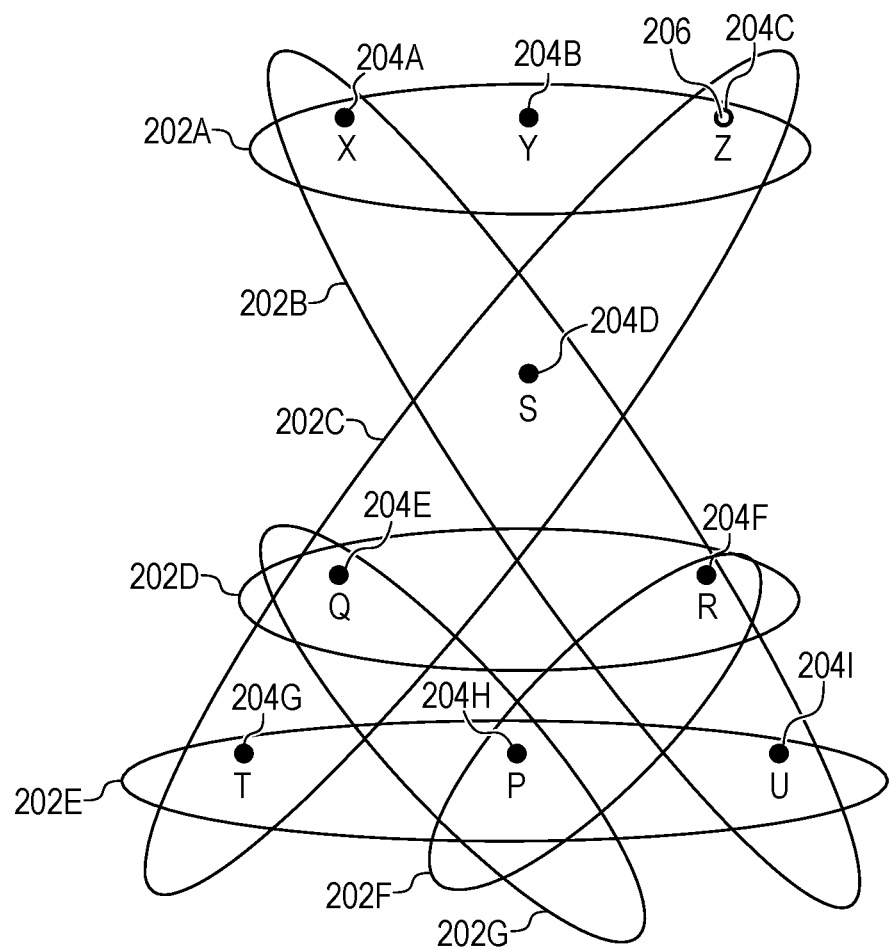
FIG. 2 is an example hypergraph, according to embodiments described herein.

FIG. 2 is an example hypergraph, according to embodiments described herein. The example hypergraph 200 may be generated using the hypergraph generator 102 of FIG. 1. The hypergraph 200 of FIG. 2 includes hyperedges 202A, 202B, 202C, 202D, 202E, 202F, and 202G representing relations. The hypergraph 200 further includes vertices 204A, 204B, 204C, 204D, 204E, 204F, 204G, 204H, and 204I representing features. In particular, hyperedge 202A represents relations between features corresponding to vertices 204A, 204B, and 204C. In the example of hyperedge 202A, the vertex 204C is also a tail 206. As used herein, a tail 206 represents a target feature. For example, a target feature may be a feature corresponding to a learning objective. As one example, the learning objective may be prediction of the particular target feature, such as a maximal temperature of an area or any other type of feature. For example, consider a dataset with features X, Y, Z, S, Q, R, T, P, U. There is a relation in which maximal temperature $Z=a*X^2+b*Y+c*X*Y+d$ for some real numbers a, b, c, d. This relation may result in the generated hyperedge 202A with {X, Y, Z} and a tail 206 z.

It is to be understood that the block diagram of FIG. 2 is not intended to indicate that the hypergraph 200 is to include all of the components shown in FIG. 2. Rather, the hypergraph 200 can include fewer or additional components not illustrated in FIG. 2 (e.g., additional vertices, or additional hyperedges, etc.).

Figure 3:
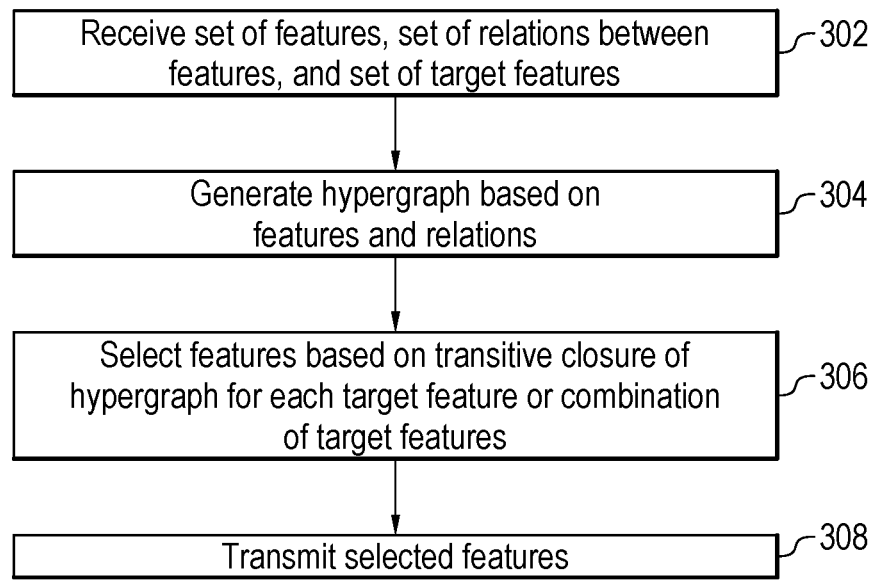
FIG. 3 is a process flow diagram of an example method that can select features using hypergraphs.

FIG. 3 is a process flow diagram of an example method that can select features using hypergraphs. The method 300 can be implemented with any suitable computing device, such as the computing device 400 of FIG. 4 and is described with reference to the system 100 of FIG. 1. For example, the methods described below can be implemented by the processor 402 or the processor 702 of FIGS. 4 and 7.

At block 302, a processor receives a set of features, a set of relations between the features, and a set of target features. For example, the target features may be features corresponding to any number of learning objectives. In some examples, in response to detecting that a relation strength between a target feature and set of features does not exceed a threshold and that the target feature is numerical, the processor converts the target feature to a set of bounded number of values. For example, the target features may be converted to the set of bounded number of values based on value ranges of the target feature. In some examples, the target features may be converted to the set of bounded number of values based on prevalent values of the target feature. In various examples, in response to detecting that a relation strength between a target feature and set of features does not exceed a threshold and that the target feature is categorical, the processor converts the target feature to a set of bounded number of values.

At block 304, the processor generates a hypergraph based on the features and the relations. For example, the generated hypergraph may include vertices representing features and weighted hyperedges representing relations. In various examples, for each identified relation between a target feature and associated set of features, the processor adds a weighted hyperedge from the vertices representing the set of features to the target feature. For example, the weight of the weighted hyperedge may represent the strength of the relation.

At block 306, the processor selects features based on a transitive closure of the hypergraph for each target feature or combination of target features. For example, the processor can select all vertices of features in the transitive closure for each of the target features or combination of target features.

At block 308, the processor transmits selected features. For example, the selected features may be used for training a machine learning model.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include training a machine learning network using the selected subset of features.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
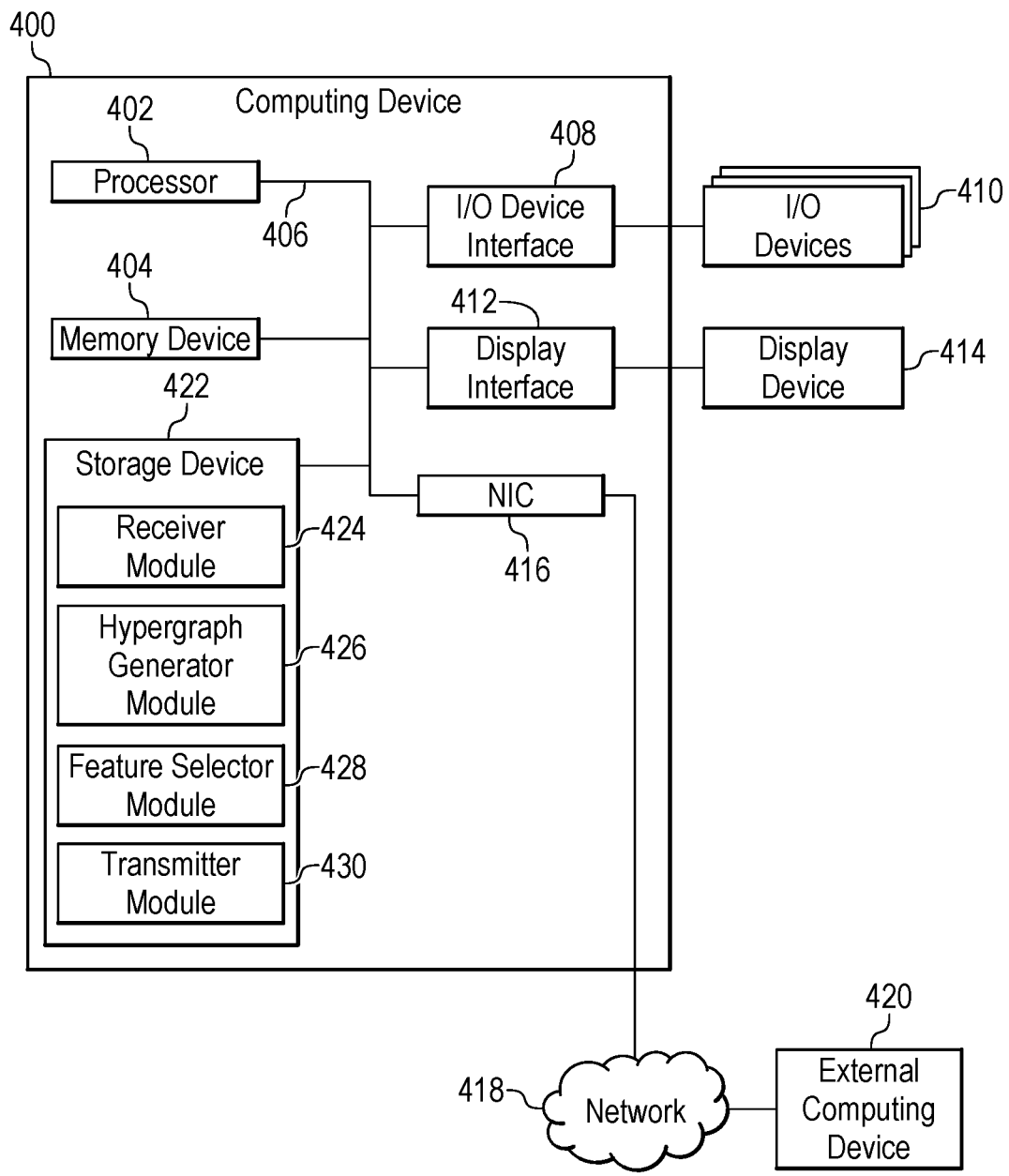
FIG. 4 is a block diagram of an example computing device that can select features using hypergraphs.

FIG. 4 is block diagram of an example computing device that can select features using hypergraphs. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a hypergraph generator module 426, a feature selector module 428, and a transmitter module 430. The receiver module 424 can receive a set of features, a set of relations between the features, and a set of target features. For example, each of the target features may be associated with a number of the relations. The hypergraph generator module 426 can generate a hypergraph based on the features and the relations. For example, the hypergraph includes a weighted hyperedge. In various examples, a weight of the weighted hyperedge represents a strength of a relation between the vertices in the weighted hyperedge. For example, the strength of the relation may be measured as an R-squared value. In some examples, the hypergraph generator module 426 can generate a hyperedge in the hypergraph for each of the relations. For example, the hyperedge may include a partially ordered subset of features. In some examples, the hypergraph generator module 426 can convert a target feature to a set of bounded number of values in response to detecting that a relation strength between the target feature and set of features does not exceed a threshold and that the target feature is numerical. In some examples, the hypergraph generator module 426 can convert a target feature to a set of bounded number of values in response to detecting that a relation strength between the target feature and set of features does not exceed a threshold and that the target feature is categorical. The feature selector module 428 can select a subset of features based on a transitive closure of the hypergraph for each of the target features. For example, the feature selector module 428 can calculate the transitive closure for each of the target features by recursively adding features with a relation to each target feature exceeding a threshold to the selected subset of features. The transmitter module 430 can transmit the selected subset of features.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). For example, the computing device 400 may include a machine learning model trainer (not shown) to train a machine learning model based on the selected subset of features. Furthermore, any of the functionalities of the receiver module 424, the hypergraph generator module 426, the feature selector module 428, and the transmitter module 430 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the hypergraph generator module 426, the feature selector module 428, and the transmitter module 430, can be implemented with logic, wherein the logic, as referred to herein, can include any suitable hardware (e.g., a processor, among others), software (e.g., an application, among others), firmware, or any suitable combination of hardware, software, and firmware.

Figure 5:
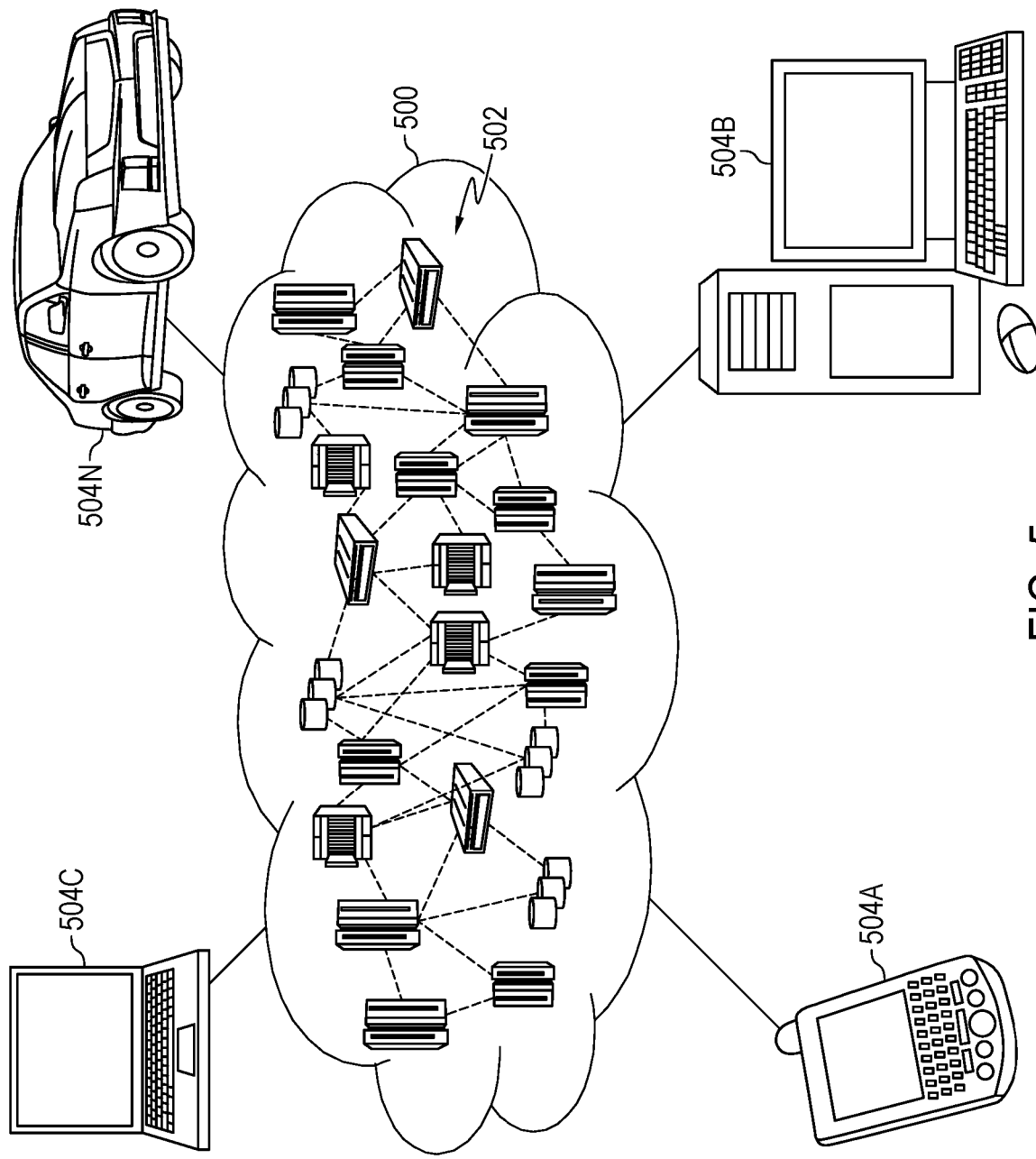
FIG. 5 is a diagram of an example cloud computing environment according to embodiments described herein.

Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
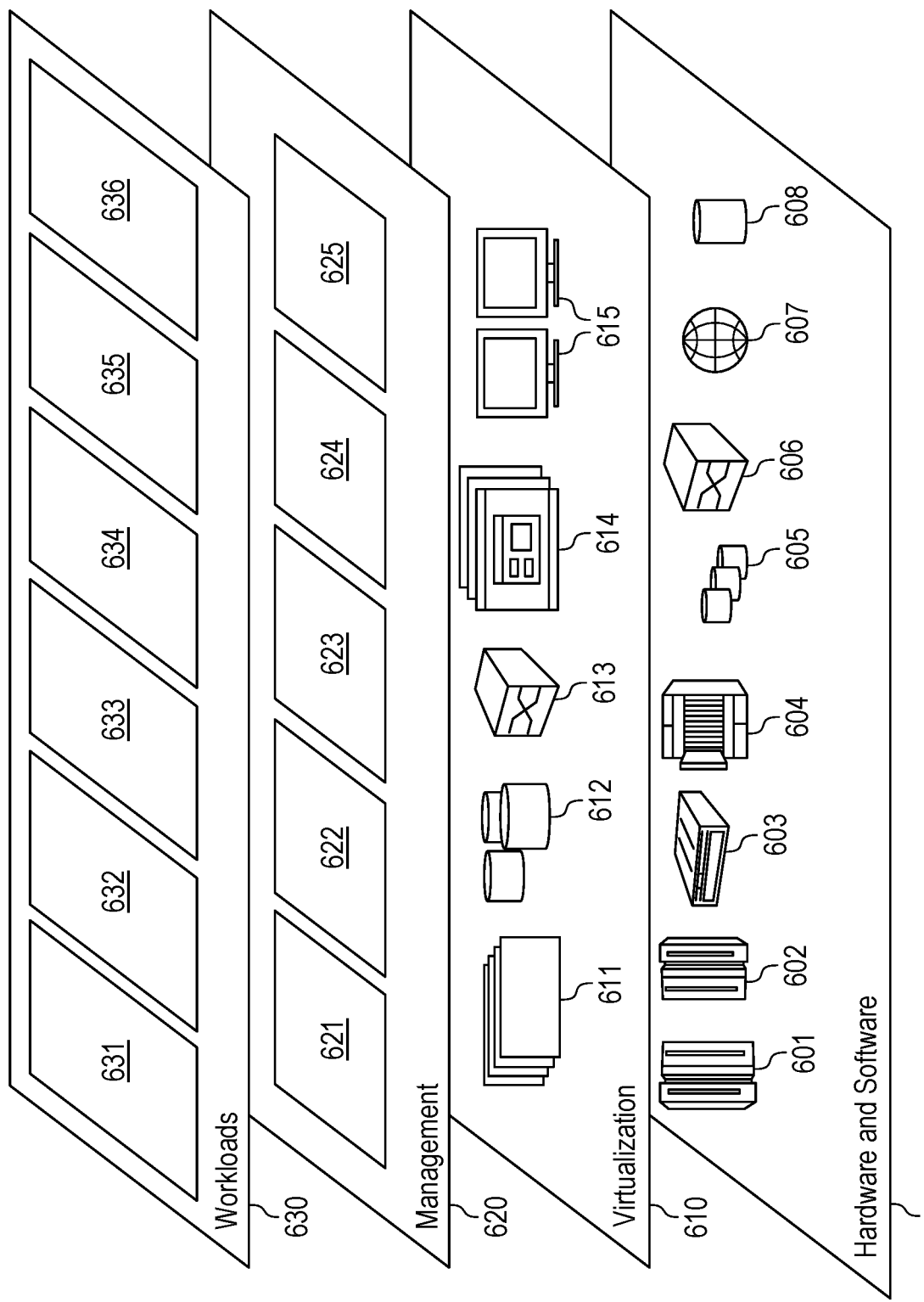
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 610 provides an abstraction layer from which the following examples of virtual entities may be provided: virtual servers 611; virtual storage 612; virtual networks 613, including virtual private networks; virtual applications and operating systems 614; and virtual clients 615.

In one example, management layer 620 may provide the functions described below. Resource provisioning 621 provides dynamic procurement of computing resources and other resources that are utilized to perform tasks within the cloud computing environment. Metering and Pricing 622 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 623 provides access to the cloud computing environment for consumers and system administrators. Service level management 624 provides cloud computing resource allocation and management such that required service levels are met. Service Level Agreement (SLA) planning and fulfillment 625 provide pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation 631; software development and lifecycle management 632; virtual classroom education delivery 633; data analytics processing 634; transaction processing 635; and feature selection 636.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
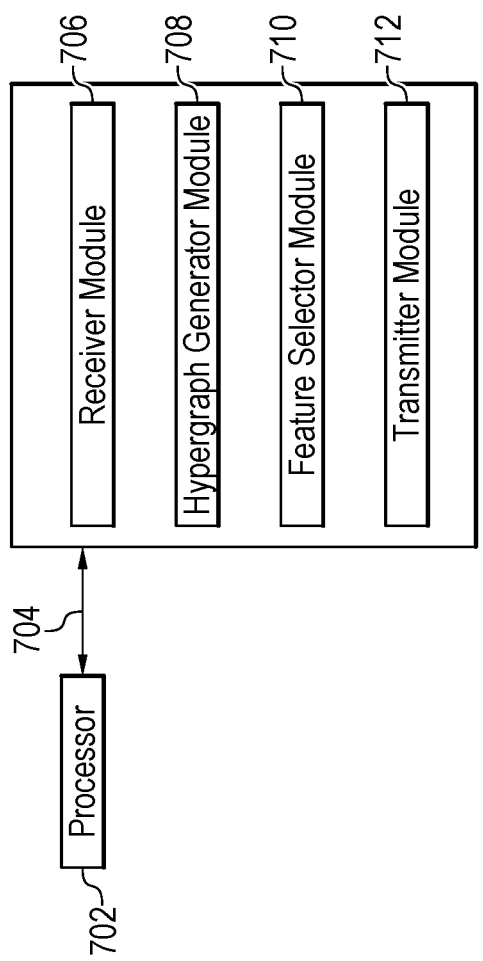
FIG. 7 is an example tangible, non-transitory computer-readable medium that can select features using hypergraphs.

Referring now to FIG. 7, a block diagram is depicted of an example tangible, non-transitory computer-readable medium 700 that can select features using hypergraphs. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a receiver module 706 includes code to receive a set of features, a set of relations between the features, and a set of target features. For example, each of the target features is associated with a plurality of the relations. A hypergraph generator module 708 includes code to generate hypergraph based on the features and the relations. In various examples, the hypergraph generator module 708 includes code to convert the target feature to a set of bounded number of values in response to detecting that a relation strength between the target objective and set of features does not exceed a threshold and that the target feature is numerical. For example, the target feature is converted to the set of bounded number of values based on value ranges of the target feature. In some examples, the target feature is converted to the set of bounded number of values based on prevalent values of the target feature. In various examples, the hypergraph generator module 708 includes code to convert the target feature to a set of bounded number of values in response to detecting that a relation strength between the target feature and set of features does not exceed a threshold and that the target feature is categorical. In various examples, the hypergraph generator module 708 includes code to add, for each identified relation between a target feature and associated set of features, a weighted hyperedge from the vertices representing the set of features to the target feature. For example, the weight of the weighted hyperedge represents the strength of the relation. In some examples, the strength of the relation may be measured as an R-squared value. A feature selector module 710 includes code to select features based on a transitive closure of the hypergraph for each of the target features or combination of target features. A transmitter module 712 includes code to transmit selected features. For example, the transmitter module 712 includes code to transmit selected features to a trainer for training a machine learning model using the selected features as a training set.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a set of features, a set of relations between the features, and a set of target features, wherein each of the target features is associated with a plurality of the relations;
generate a hypergraph based on the features and the relations, wherein the hypergraph comprises a weighted hyperedge, wherein a weight of the weighted hyperedge represents a strength of a relation between vertices in the weighted hyperedge;
select a subset of features based on a transitive closure of the hypergraph for each of the target features; and
transmit the selected subset of features.

2. The system of claim 1, wherein the processor is to generate a hyperedge in the hypergraph for each of the relations, wherein the hyperedge comprises a partially ordered subset of features.

3. The system of claim 1, wherein the processor is to calculate the transitive closure for each of the target features by recursively adding features with a relation to each target feature exceeding a threshold to the selected subset of features.

4. The system of claim 1, wherein the processor is to convert a target feature to a set of bounded number of values in response to detecting that a relation strength between the target feature and set of features does not exceed a threshold and that the target feature is numerical.

5. The system of claim 1, wherein the processor is to convert a target feature to a set of bounded number of values in response to detecting that a relation strength between the target feature and set of features does not exceed a threshold and that the target feature is categorical.

6. The system of claim 1, wherein the processor is to train a machine learning model based on the selected subset of features.

7. A computer-implemented method, comprising:
receiving, via a processor, a set of features, a set of relations between the features, and a set of target features, wherein each of the target features is associated with a plurality of the relations;
generating, via the processor, a hypergraph based on the features and the relations, wherein the hypergraph comprises a weighted hyperedge, wherein a weight of the weighted hyperedge represents a strength of a relation between vertices in the weighted hyperedge;
selecting, via the processor, a subset of features based on a transitive closure of the hypergraph for each of the target features; and
transmitting, via the processor, the selected subset of features.

8. The computer-implemented method of claim 7, comprising, in response to detecting that a relation strength between a target feature and set of features does not exceed a threshold and that the target feature is numerical, converting the target feature to a set of bounded number of values.

9. The computer-implemented method of claim 8, wherein the target feature is converted to the set of bounded number of values based on value ranges of the target feature.

10. The computer-implemented method of claim 8, wherein the target feature is converted to the set of bounded number of values based on prevalent values of the target feature.

11. The computer-implemented method of claim 7, comprising, in response to detecting that a relation strength between a target feature and set of features does not exceed a threshold and that the target feature is categorical, converting the target feature to a set of bounded number of values.

12. The computer-implemented method of claim 7, wherein generating the hypergraph comprises, for each identified relation between a target feature and associated set of features, adding a weighted hyperedge from the vertices representing the set of features to the target feature.

13. The computer-implemented method of claim 7, further comprising training a machine learning network using the selected subset of features.

14. A computer program product for selection of features, the computer program product comprising a computer-readable storage medium having program code embodied therewith, wherein the computer-readable storage medium is not a transitory signal per se, the program code executable by a processor to cause the processor to:
receive a set of features, a set of relations between the features, and a set of target features, wherein each of the target features is associated with a plurality of the relations;
generate a hypergraph based on the features and the relations, wherein the hypergraph comprises a weighted hyperedge, wherein a weight of the weighted hyperedge represents a strength of a relation between vertices in the weighted hyperedge;
select features based on a transitive closure of the hypergraph for each of the target features; and
transmit selected features.

15. The computer program product of claim 14, further comprising program code executable by the processor to convert a target feature to a set of bounded number of values in response to detecting that a relation strength between the target feature and the set of features does not exceed a threshold and that the target feature is numerical.

16. The computer program product of claim 15, wherein the target feature is converted to the set of bounded number of values based on value ranges of the target feature.

17. The computer program product of claim 15, wherein the target feature is converted to the set of bounded number of values based on prevalent values of the target feature.

18. The computer program product of claim 14, further comprising program code executable by the processor to convert a target feature to a set of bounded number of values in response to detecting that a relation strength between the target feature and the set of features does not exceed a threshold and that the target feature is categorical.

19. The computer program product of claim 14, further comprising program code executable by the processor to add, for each identified relation between a target feature and an associated set of features, a weighted hyperedge from the vertices representing the set of features to the target feature.

* * * * *